US005683663A

United States Patent [19]

Keller et al.

[11] Patent Number: 5,683,663

[45] Date of Patent: Nov. 4, 1997

[54] DECOMPOSITION OF CYANIDE IN ELECTROLYTIC CELL LINING

[76] Inventors: Rudolph Keller, 4221 Roundtop Rd., Export, Pa. 15632; C. Norman Cochran, 22 Oak Glenn Dr., Oakmont, Pa. 15139; David B. Stofesky, 611 Mayville Ave., Pittsburgh, Pa. 15226

[21] Appl. No.: 661,920

[22] Filed: Jun. 12, 1996

Related U.S. Application Data

[63] Continuation-in-part of Ser. No. 375,790, Jan. 20, 1995, Pat. No. 5,538,604.

[51] Int. Cl.[6] .................... C01F 1/00; A62D 3/00

[52] U.S. Cl. .................... 423/111; 588/246; 205/687; 423/371

[58] Field of Search .................... 204/243 R, 294; 205/687; 423/111; 588/246

[56] References Cited

U.S. PATENT DOCUMENTS 4,889,695 12/1989 Bush .................... 423/489 X
5,160,637 11/1992 Bell et al. .................... 210/766
5,470,559 11/1995 Grolman et al. .................... 423/489

*Primary Examiner*—Donald R. Valentine
*Attorney, Agent, or Firm*—Andrew Alexander

[57] ABSTRACT

A method of treating sodium cyanide in spent carbonaceous and/or refractory material, i.e., spent potlining, from an electrolytic cell for producing aluminum from alumina dissolved in a sodium-containing electrolyte, wherein sodium cyanide forms in the carbonaceous material during operation of the cell. The method comprises grinding the spent carbonaceous and/or refractory material containing sodium cyanide to provide particles of spent carbonaceous material and adding a reactive material capable of reacting with the sodium cyanide to provide a mixture of reactive material and spent potlining material. Thereafter, the mixture is heated to a temperature effective in reacting the reactive material with the sodium cyanide to destroy the sodium cyanide in the spent potlining.

25 Claims, 1 Drawing Sheet

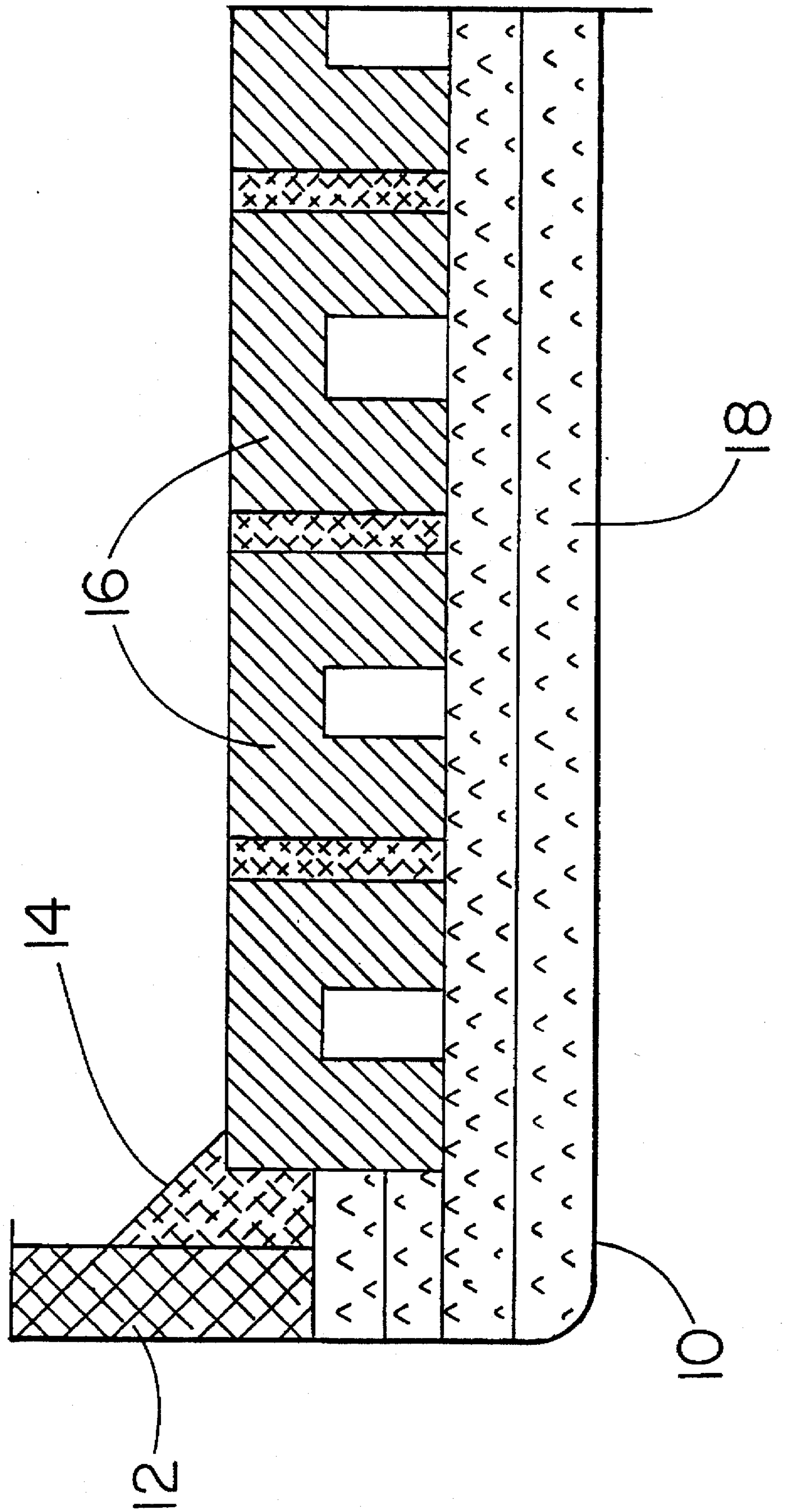
18
16
14
12
10

DECOMPOSITION OF CYANIDE IN ELECTROLYTIC CELL LINING

CROSS REFERENCE TO RELATED APPLICATIONS

This application is a continuation-in-part of U.S. Ser. No. 08/375,790, filed Jan. 20, 1995, now U.S. Pat. No. 5,538,604.

BACKGROUND OF THE INVENTION

This invention relates to cyanide in carbonaceous and/or refractory materials used in electrolytic cells for producing aluminum such as in the carbonaceous and/or refractory linings of Hall cells, and more particularly, it relates to a treatment for destroying or decomposing cyanide and other materials in spent carbonaceous and/or refractory linings, herein referred to as spent potlinings.

In the Hall-Heroult process for making primary aluminum, aluminum oxide is dissolved in a molten salt such as cryolite and then electrolyzed to form molten aluminum at the cathode. The electrolysis is carried out at a temperature in the range of about 930° to 980° C. The molten salt is contained in a steel shell which is lined with refractories and carbonaceous material. The lining containing the cathode metal, located in the bottom of the cell, is usually made of carbon materials. In addition, refractories are used to maintain thermal conditions in the cell. The amount of carbon used is substantial. For example, a Hall-Heroult cell of moderate size uses about 24,000 pounds of carbon block for lining purposes and uses about 10,000 pounds of carbon ramming paste to complete the lining and to hold the carbon blocks in place. The cell has to be relined about every 4 to 6 years, producing large quantities of used carbonaceous material and refractories, i.e., spent potlining.

Disposing of the spent potlining is not without problems because the lining contains, among other materials, cyanide, e.g., sodium cyanide, typically on the order of about 0.1 wt. % and fluorides typically on the order of 0.1 wt. %. The amount of cyanide or fluoride in the used cell liner can vary depending on how long the cell has been used, on the type of carbon used, cell design and how it is operated. The sodium cyanide forms in the liner material during the operation of the cell as a result of sodium, carbon and nitrogen being present, and fluoride results from the electrolyte used in the cell. Because the spent potlining contains cyanides, it has been listed by the Environmental Protection Agency as a hazardous waste. Thus, there is a great need for a process that permits the use of the carbonaceous liner without the formation of cyanide or which is effective in destroying or decomposing cyanide and/or stabilizing the fluorides from the spent potlining.

In the past, numerous approaches have been used to convert the cyanides and to render the spent potliner material safe for disposal. For example, U.S. Pat. No. 5,222,448 discloses that spent potliner is treated by introducing it into a vessel, and exposing it to the heat of a plasma torch at a temperature of at least 1000° C. As a result, carbon is gasified and converted to combustible carbon monoxide or hydrocarbons, or to carbon dioxide; inorganic material is melted to form slag; fluoride compounds are melted, vaporized, or reduced to gaseous HF; cyanide compounds are destroyed; and all other materials, including sulfur compounds, are either melted or gasified. As a result, the spent potliner is rendered non-hazardous, and the quantity of remaining slag has both its solid volume and mass substantially reduced by a factor of at least 1.5:1 in mass and at least 3:1 in volume relative to the input spent potliner.

U.S. Pat. No. 4,576,651 discloses a process for treating fluoride-contaminated scrap lining material from electrolytic reduction cells which comprises mixing the material with 7–30 parts of sulfuric acid and sufficient water to bring liquid content to 60–80 parts per 100 parts of lining material, mixing in sufficient lime to at least neutralize the sulfuric acid and make the slurry slightly alkaline, the slurry then being allowed to set into a solid mass. The slurry should be of a paste-like consistency. The lime may be wholly calcium hydroxide, but a substantial proportion may be in the form of calcium carbonate. The scrap, before or after the above treatment with lime and sulfuric acid, is preferably heated to 150°–500° C. in the presence of water vapor to destroy cyanides.

U.S. Pat. No. 4,763,585 discloses a process for the combustion of ground, spent potlinings generated during the production of metallic aluminum. The process includes grinding the potlinings to a particle size of not greater than about 2 inches in any dimension; mixing with the ground potlinings from about 1 to about 20 wt. %, based upon the weight of the potlinings, of a powdered inert additive having a median particle size of not greater than 10 micrometers, and burning the ground potlinings in a combustor at a temperature in the range of from 1400° F. to about 2200° F., the additive coating the ground potlinings and preventing their agglomeration in the combustion zone therein.

U.S. Pat. No. 4,973,464 discloses a method for removal of cyanides from spent potlinings from aluminum manufacture. The method discloses the treatment of ground, spent potlinings generated during the production of metallic aluminum to reduce cyanide content to environmentally nonhazardous levels. Potlinings are ground or otherwise suitably reduced in size to a particle size of not greater than about 2 inches in any dimension and roasted in a stream of air or nitrogen at a temperature between about 500° and 1400° F. Roasting for an appropriate time-temperature interval reduces cyanide content to desired levels without combustion of a major portion of carbonaceous material, resulting in an end product rich in carbon and fluorine which may be salable because of this content.

U.S. Pat. No. 4,993,323 discloses that an environmentally acceptable and effective method for thermal destruction of Spent Potliner (SPL) by Fluidized Bed Combustion (FBC) has been established. This method has overcome problems associated with ash agglomeration, ash leachate character and emission control, the primary obstacles for applying FBC to the disposal of SPL and like solid fuels. Specifically, "recipes" of appropriate additives (fuel blends) are proposed. A mixture of lignite, limestone and SPL in an appropriate proportion has proven to notably increase the agglomeration temperature of the ash, allowing this low-melting waste to be destroyed continuously by FBC. Ash leachate character is modified by control of ash chemistry to ensure that fluoride anions and metallic cations are at or below acceptable limits.

U.S. Pat. No. 5,024,822 discloses a process for treating spent potlining from the electrolytic smelting of aluminum in cryolite including incinerating the potlining to combust carbonaceous material to form an ash at a temperature low enough to maintain low fluorine vapor pressures, admixing siliceous material with the potlining either before or after the ash-forming stage, and heating the ash and siliceous material to form a glassy residue.

In Norwegian Disclosure 175,159, the cyanide-containing potlining is treated in sire by raising the cell temperature before shut-down of the cell, thus promoting penetration of electrolyte into the lining to react with the cyanide.

However, in spite of these processes, there is still a great need for a method which is effective in removing cyanide to correct the hazardous waste problems resulting from spent potlinings.

SUMMARY OF THE INVENTION

It is an object of the invention to provide an improved carbonaceous potlining for aluminum producing electrolytic cell.

It is another object of the invention to provide an improved carbonaceous potlining for an aluminum producing electrolytic cell capable of suppressing formation of cyanide compounds during operation of the cell.

Yet, it is another object of the present invention to provide a novel carbonaceous composition suitable for use as a potliner in aluminum-producing electrolytic cells for suppressing formation of cyanides during operation of the cell.

Still, it is another object of this invention to provide a treatment which is effective in removing or destroying cyanide present in spent potlinings.

These and other objects will become apparent from reading the specification and claims appended hereto.

In accordance with these objects, there is provided a method of treating sodium cyanide in spent carbonaceous and/or refractory material, i.e., spent potlining, from an electrolytic cell for producing aluminum from alumina dissolved in a sodium-containing electrolyte, wherein sodium cyanide forms in the carbonaceous material during operation of the cell. The method comprises grinding the spent carbonaceous and/or refractory material containing sodium cyanide to provide particles of spent carbonaceous material and adding a reactive material capable of reacting with the sodium cyanide to provide a mixture of reactive material and spent potlining material. Thereafter, the mixture is heated to a temperature effective in reacting the reactive material with the sodium cyanide to destroy the sodium cyanide in the spent potlining.

BRIEF DESCRIPTION OF THE DRAWING

The FIGURE is a cross-sectional view of a section of a wall and bottom of a Hall cell used for making aluminum.

DETAILED DESCRIPTION OF PREFERRED EMBODIMENTS

As noted, cyanide compounds form in the carbonaceous lining of electrolytic cells during the production of aluminum. Cyanide compounds form in the carbonaceous material from the presence of carbon, sodium and nitrogen at elevated temperatures. The carbon source is the carbonaceous cell lining, i.e., carbonaceous blocks, carbonaceous boards, and carbonaceous based ramming mix and seam paste used. Sodium and fluorides result from the molten salt electrolyte containing cryolite ($Na_3AlF_6$) used to dissolve alma ($Al_2O_3$). In the electrolytic reduction of alumina to aluminum and carbon dioxide, sodium of the electrolyte is reduced at the same time as the alma. The sodium that is reduced from electrolyte provides free sodium. The sodium migrates or is transferred through or into the carbonaceous lining and ramming paste. The source of nitrogen for the reaction is provided by the air which penetrates into the cathode blocks and into the carbonaceous liner. The reaction that produces undesirable sodium cyanide is as follows:

$$2C+2Na+N_2 \rightarrow 2NaCN$$

The sodium cyanide may migrate within the cell, even to contaminate refractory parts of the potlining. Thus, the purpose of the present invention is to suppress or stop the formation or accumulation of cyanide compounds such as sodium cyanide in potlinings of aluminum-producing electrolytic cells. Accordingly, there is provided a novel carbonaceous base material and a reactive compound suitable for potlinings, cathode blocks, ramming paste and seam mix which is resistant to formation of cyanide compounds. The reactive compound must be capable of reacting with sodium, nitrogen or sodium cyanide under the conditions prevailing in the carbonaceous material present in the liner, cathode block, or ramming mix utilized in an aluminum-producing electrolyte cell. Thus, the novel material can comprise 0.1 to 30 wt. % of a compound reactive with sodium, nitrogen or sodium cyanide in the presence of carbon to avoid or suppress the formation or accumulation of cyanide compounds, the remainder of the novel material comprising carbon. By carbon as used herein is meant to include carbon as used in potlinings, cathode blocks, ramming paste, and seam mix as used in aluminum-producing electrolytic cells.

The novel carbonaceous base material can comprise carbon and 0.1 to 30 wt. % of a reactive compound of a carbide, fluoride, carbonate, or oxide, the compound reactive with sodium, nitrogen or sodium cyanide in the presence of carbon to avoid the formation or accumulation of cyanide compounds. A metal reactive with sodium, nitrogen or sodium cyanide such as aluminum, magnesium, silicon, boron or zinc, may be used. The metals may be provided in finely divided or powder form. Examples of reactive carbide compounds useful in said novel material include silicon carbide, aluminum carbide, titanium carbide and boron carbide. Reactive fluoride compounds useful in the novel invention include aluminum fluoride ($AlF_3$), cryolite ($Na_3AlF_6$), titanium fluoride ($TiF_3$), zirconium fluoride ($ZrF_4$), calcium fluoride ($CaF_2$) and magnesium fluoride ($MgF_2$). Examples of reactive carbonate compounds useful in said novel invention are lithium carbonate ($Li_2CO_3$), calcium carbonate ($CaCO_3$) and barium carbonate ($BaCO_3$). Examples of reactive oxide compounds include boron oxide, sodium borate, calcium borate, sodium tetraborate, boric acid, calcium oxide and rare earth oxides.

Of the above compounds reactive with sodium, nitrogen or sodium cyanide, the preferred reactive compounds are boron oxide and its derivatives such as boric acid, sodium borate and sodium tetraborate. That is, the boron oxide compounds are preferred because they can combine with sodium or nitrogen. Further, the boron oxide compounds are preferred because they are reactive with cyanide compounds such as sodium cyanide to convert or decompose it to environmentally benign compounds such as boron nitride and sodium borates. That is, if for some reason, sodium cyanide forms, reactive boron oxide compounds are effective in reacting and converting the cyanide compound to environmentally benign compounds. Of the boron oxide compounds, boron oxide ($B_2O_3$) is preferred. Also, preferably, the novel material comprises carbon and 0.5 to 10 wt. % reactive compound. A typical mount of reactive compound is in the range of 1 to 5 wt. %. It will be appreciated that combinations of such compounds may be used.

The reactive compound should be capable of reacting with sodium, nitrogen or sodium cyanide at operating conditions prevalent in the carbonaceous material in the electrolyte cell during operation. Thus, the reactive compound should be capable of reacting with sodium, nitrogen or sodium cyanide in the presence of carbon in a temperature range of 500° to 1000° C. Further, a reactive compound that is reactive with sodium can also lessen the harmful effect of sodium intercalation into the potlining, thus leading to extended pot life.

The FIGURE shows a typical construction of a cell bottom 10 with prebaked lining 12 and rammed joints 14. Prefabricated cathode blocks 16 are placed on top of insulating refractories 18. Blocks 16 are traditionally made from rotary kiln or gas calcined anthracite aggregate or electrically calcined anthracite, mixed with a pitch binder. Graphite components can be substituted to increase electrical conductivity. In prefabrication of cathode blocks, green blocks are shaped and pressed, and subsequently baked in special furnaces. Ramming paste 14 is used to fill the spaces and form seams between individual cathode blocks, also to connect the side walls with the carbon blocks. Hot ramming pastes consist of an anthracitic filler and a pitch binder. Room temperature paste binder formulations are usually based on a coal-tar or a coal-tar pitch, with a solvent or other additive to lower its softening point and/or increase its coke yield. Also, molasses or additions of solid pitch fines may be included in some formulations. The ramming paste is baked in situ on cell start-up. Ramming paste may be used for the carbonaceous cathodes to form the so-called monolithic cathodes. The sidewalls are usually made from prebaked carbon blocks, ramming paste, or a combination of both. The desired properties oft he sidewall are, however, different from those sought for the cathode bottom, and carbon sidewalls are not always the preferred choice.

In the process of using the present invention, a carbonaceous material comprising carbon and the reactive compound are mixed thoroughly and then fabricated into a suitable inner cathode block, ramming mix, or seam mix for use in an aluminum-producing electrolytic cell. That is, the reactive compound is mixed with carbon and/or pitch, depending on the end use, to form a green mix. The green mix is then shaped into cathode blocks or liner. The green cathode blocks are then baked before use, whereby volatile material is driven off. Ramming paste is baked in situ on cell start-up. Then, during operation of the cell, the reactive compound mixed into the carbonaceous mix will operate to scavenge sodium or nitrogen by forming compounds which prevent the formation of cyanide. Sodium cyanide, as it is generated and penetrates the walls or cathode of the cell, will be decomposed by the reactive compound even at places separated from its formation.

In the invention, the mount of the reactive compound dispersed in the carbon material can be varied depending on the potlining and its location in the cell. For example, pockets or layers of the reactive compound can be positioned strategically, if desired. Further, in electrolytic cells that have been in operation, bore holes can be drilled in the potliner or cathode and such holes filled with the reactive compound. When the reactive compound is boron oxide, for example, it has the capability of reacting with the sodium cyanide to form boron nitride and sodium borates according to the following reaction:

$$6NaCN+7B_2O_3 \rightarrow 6C+2N_2+2BN+3Na_2B_4O_7.$$

Thus, it will be appreciated that the electrolytic cell can be operated for a number of years and then treated as noted to decompose sodium cyanide formed in the liner, ramming mix or cathode block to capture free sodium or nitrogen therein.

In another embodiment of the invention, spent carbonaceous and/or refractory material, e.g., spent potlinings or cathodes, etc., may be treated in accordance with the invention to destroy or remove cyanide. In spent carbonaceous material, the amount of cyanide (CN as a component of cyanide compounds) can range from less than 0.1 wt. % to greater than 3 wt. %, depending on the length of time used in the cell. Thus, this mount has to be lowered to less than 48 ppm in order to satisfy the TCLP limits applied by EPA for the classification of a treatment product of another potlining treatment process as nonhazardous.

For purposes of this embodiment of the invention, the spent carbonaceous and/or refractory material may be ground to ,a particle size, preferably less than 10 mesh (U.S. Sieve series). During the grinding operation, it is preferred to maintain the spent potlining material in a dry condition and avoid the addition of water to prevent evolution of gaseous hydrogen cyanide, hydrogen, methane, and ammonia, for example.

To the ground spent potlining material is added an effective mount of a material reactive with the cyanide. Preferably, the reactive material is provided in finely divided or powder form. As noted earlier, the material reactive with cyanide in the presence of carbon can be selected from carbides, fluorides, carbonates, oxides or a metal selected from aluminum, magnesium, silicon, boron or zinc. As noted above, examples of reactive carbide compounds useful in said novel material include silicon carbide, aluminum carbide, titanium carbide and boron carbide. Reactive fluoride compounds useful in the novel invention include aluminum fluoride ($AlF_3$), cryolite ($Na_3AlF_6$), titanium fluoride ($TiF_3$), zirconium fluoride ($ZrF_4$), calcium fluoride ($CaF_2$) and magnesium fluoride ($MgF_2$). Examples of reactive carbonate compounds useful in said novel invention are lithium carbonate ($Li_2CO_3$), calcium carbonate ($CaCO_3$) and barium carbonate ($BaCO_3$). Examples of reactive oxide compounds include boron oxide, sodium borate, calcium borate, sodium tetraborate, boric acid, calcium oxide and rare earth oxides.

Of the above compounds reactive with cyanide, the preferred reactive compounds are boron oxide and its derivatives such as boric acid, sodium borate and sodium tetraborate. That is, the boron oxide compounds are preferred because they can combine with sodium or nitrogen compounds also present in the spent carbonaceous material. Further, the boron oxide compounds are preferred because they are reactive with cyanide compounds such as sodium cyanide to convert or decompose it to environmentally benign compounds such as boron nitride and sodium borates. That is, reactive boron oxide compounds are effective in reacting and converting the cyanide compound to environmentally benign compounds. Of the boron oxide compounds, boron oxide ($B_2O_3$) is preferred.

The mount of material reactive with cyanide that can be added is an mount effective in converting or destroying the cyanide and preferably leaving not more than 48 ppm cyanide (as CN) in the spent carbonaceous material after the treatment. Thus, the mount of material reactive with the ground carbonaceous material is greater than 1 wt. %, preferably in the range of 1 to 30 wt. %, and typically in the range of 5 to 20 wt. %, depending on the amount of cyanide present.

In treating the spent carbonaceous and/or refractory material to remove or decompose cyanide, it may also be treated to remove or stabilize fluorides which can comprise up to 20 wt. % of the spent potlining. Thus, a material reactive with fluorides in the spent carbonaceous material may also be included or dispersed with the material reactive with the cyanide. For example, lime is reactive with fluorides to produce inert or benign compounds such as $CaF_2$. The amount of lime that may be added is generally greater than 1 wt. % and typically in the range of 1 to 20 wt. %. Other compounds or materials may be added, depending on the selective removal of compounds desired.

After the reactive material is added to the spent potlining, it is mixed thoroughly to provide a homogeneous mixture. Thereafter, the mixture is heated to a temperature which permits reaction of the reactive material with the cyanide or the fluoride. For purposes of reacting the cyanide, for example, the temperature of the mix can be raised to between 450° to 750° C. The time at temperature is usually greater than ½ hour and typically in the range of 1 to 7 hours, with longer times not known to be detrimental, except shorter times are preferred for purposes of economy.

The following examples illustrate the effectiveness of different reactive compounds in suppressing formation of sodium cyanide carbon potlining material used in electrolytic cells for the production of aluminum.

Refractory materials referred to can include materials such as alumina used for assisting alignment of cathode blocks. Further, the refractory material can include a refractory layer comprised of blocks which provide a stable base for the cathode blocks. A typical refractory layer can include a mixture of silicon oxide, aluminum oxide and iron oxide. In addition, the refractory material can include an insulating layer typically comprised of calcium silicate, insulting fire brick, alumina, and/or vermiculite.

EXAMPLE 1

To carbonaceous material used as a commercial ramming mix (Midwest Carbon), composed of sized gas-calcined anthracite coal and about 10% coal-tar pitch, was added aluminum carbide, $Al_4C_3$, to provide a mix containing 3 wt. % $Al_4C_3$. A 47.5 gm sample of the mix containing $Al_4C_3$ was exposed to 2.60 gm of sodium and a nitrogen atmosphere at 600° C. After 3 hours of heating, 646 ml of nitrogen was consumed. The sample was then analyzed and found to contain 1.49 wt. % cyanide (as CN). Another sample was treated in the same way except $Al_4C_3$ was not added. The sample without $Al_4C_3$ was found to contain about 2.6 wt. % cyanide (as CN). Thus, the addition of $Al_4C_3$ resulted in a decrease of 40% in the amount of cyanide formed.

EXAMPLE 2

Several reactive compounds were tested to determine their effectiveness in suppressing sodium cyanide formation in potlining material. The samples were prepared and tested as in Example 1. The reactive compounds and results are provided in Table 1.

TABLE 1

| Sodium Weight (g) | Reactive Compound (Initial wt. %) | ΔVN2 (ml) | Weight CN (g) | % CN Reduction |
|---|---|---|---|---|
| 2.60 | none | −747 | 1.365 | — |
| 2.60 | 5 wt. % $SiO_2$ | −418 | 0.633 | 53.6 |
| 2.60 | 5 wt. % $Al_4C_3$ | −631 | 0.975 | 28.6 |
| 2.60 | 3 wt. % $B_4C$ | −392 | 0.407 | 70.2 |
| 1.15 | none | −297 | 0.574 | — |
| 1.15 | 8.2 wt. % SiC | −265 | 0.444 | 22.6 |
| 1.15 | 5 wt. % $B_2O_3$ | −15 | 0.013 | 97.7 |
| 1.15 | 20 wt. % $B_2O_3$ | +46 | 0.0004 | 99.9 |

It will be seen from Table 1 that $B_2O_3$ was the most effective reactive compound in suppressing formation of cyanide. That is, the 20 wt. % $B_2O_3$ sample only contained about 9 ppm cyanide (as CN) in a 45.8 gm sample. It should be noted that these conditions for the test are believed to be more severe than normal aluminum electrolytic cell production conditions, and the test conditions are believed to favor cyanide formation more than cell production conditions would. In the test, sodium was present at unit activity, and its activity in a potlining is about 0.05. Further, in the test, excess quantities of nitrogen were provided and the temperature of the test, 600° C., is believed to be more favorable to cyanide formation than the higher temperatures at which aluminum production cells are operated.

EXAMPLE 3

Pressed carbon samples, fabricated from commercial ramming paste mix, were reacted with metallic sodium in an $N_2$ atmosphere at an elevated temperature to produce a cyanide-contaminated carbon sample batch. Analysis showed that the material in the batch had an initial cyanide percentage of 0.970 wt. % CN. A 31.70 gram sample was ground and mixed with 10 wt. % $B_2O_3$ and then reacted in a sealed vessel containing an air atmosphere at 750° C. for 4 hours. Agitation was effected throughout the test by implementation of a motor and a stirring rod lowered into the crucible. After the treatment, the cyanide weight percentage in the sample dropped to 0.005 wt. % CN (50 ppm), a 99.4% reduction in cyanide content.

EXAMPLE 4

A sample of spent industrial potlining was received from a dry-dug pot at NSA in Kentucky. The material was crashed, mixed, analyzed and separated into several individual samples. The initial cyanide concentration was 0.770 wt. % $CN^-$. A 17.60 gram sample (sorted so that all of the particles were <10 mesh) was mixed with 10 wt. % $B_2O_3$ and heated to 600° C. in a sealed vessel containing an air atmosphere. The material was reacted under static conditions for four hours. Analysis of the resultant sample indicated a cyanide content of 0.016 wt. % $CN^-$, which translated to a 97.8% reduction of the cyanide present.

EXAMPLE 5

A 33.53 gram sample of spent industrial potlining from NSA (sorted to a size >6 mesh) containing 0.77 wt. % CN was mixed with 10 wt. % $B_2O_3$ and heated to 750° C. for 4 hours in a sealed vessel containing an air atmosphere. Sample agitation was effected throughout the test by implementation of a motor and a stirring rod lowered into the crucible containing the sample. After the treatment, analysis of the resultant sample indicated a cyanide content of 0.009 wt. % CN (90 ppm), or a 98.8% reduction of the cyanide present, 0.770 wt. % CN.

EXAMPLE 6

A 30.71 gram paste fabricated sample containing 0.970 wt. % CN was mixed with 10 wt. % $H_3BO_3$. The sample was reacted in a sealed vessel containing an argon atmosphere for 4 hours at a temperature of 750° C. Sample agitation was effected throughout the test by implementation of a motor and a stirring rod lowered into the crucible. As a result of the treatment, the cyanide weight percentage dropped to 0.009 wt. % CN (90 ppm), a 99.0% reduction in the initial cyanide content.

While the invention has been described in terms of preferred embodiments, the claims appended hereto are intended to encompass other embodiments which fall within the spirit of the invention.

What is claimed is:

1. A method of treating sodium cyanide in spent potlining material including at least one of carbonaceous liners, cathode blocks and refractory material from an electrolytic cell for producing aluminum from alumina dissolved in a sodium-containing electrolyte, wherein sodium cyanide forms in the carbonaceous material during operation of the cell, the method comprising the steps of:

(a) grinding the spent potlining material containing sodium cyanide to provide particles of spent potlining material;

(b) adding a reactive material selected from the group consisting of carbide, fluoride, carbonate and oxide material capable of reacting with said sodium cyanide to provide a mixture of reactive material and spent potlining material; and (c) heating said mixture to a temperature effective in reacting said reactive material with said sodium cyanide to destroy said sodium cyanide.

2. The method in accordance with claim 1 including heating said mixture to a temperature in the range of 450° to 750° C.

3. The method in accordance with claim 1 including grinding said spent potlining to a particle size less than 10 mesh (U.S. Sieve Series).

4. The method in accordance with claim 1 including maintaining said mixture at the temperature for a period in the range of ½ to 7 hours.

5. The method in accordance with claim 1 including the step of maintaining the reactive material in the range of 1 to 30 wt. %.

6. The method in accordance with claim 1 including the step of using a carbide reactive material selected from the group consisting of silicon carbide, aluminum carbide, titanium carbide and boron carbide.

7. The method in accordance with claim 1 including the step of using fluoride reactive material selected from the group consisting of cryolite, aluminum fluoride, titanium fluoride, zirconium fluoride, calcium fluoride and magnesium fluoride.

8. The method in accordance with claim 1 including the step of using oxide reactive material selected from the group consisting of boron oxide, sodium borate, aluminum borate, sodium tetraborate, calcium borate, bode acid, calcium oxide and rare earth oxides.

9. The method in accordance with claim 1 wherein said reactive material is boron oxide.

10. The method in accordance with claim 1 including grinding said spent potlining to a particle size less than 48 mesh (U.S. Sieve Series).

11. A method of treating sodium cyanide in spent potlining material from an electrolytic cell for producing aluminum from alumina dissolved in a sodium-containing electrolyte, wherein a cyanide compound forms in the spent potlining material, the method comprising the steps of:

(a) grinding the spent potlining material containing said cyanide compound to provide particles of spent potlining material;

(b) adding a reactive compound capable of reacting with said cyanide compound to provide a mixture of reactive compound and spent potlining material, said reactive compound selected from the group consisting of boron oxide, sodium borate, sodium tetraborate, calcium borate, boric acid, calcium oxide and rare earth oxides, said reactive compound present in an amount sufficient to destroy said cyanide compound in said spent potlining material; and (c) heating said mixture to a temperature effective in reacting said reactive compound with said cyanide compound.

12. The method in accordance with claim 11 including heating said mixture to a temperature in the range of 450° to 750° C.

13. The method in accordance with claim 11 including grinding said spent potlining to a particle size less than 10 mesh (U.S. Sieve Series).

14. The method in accordance with claim 11 including maintaining said mixture at the temperature for a period in the range of ½ to 7 hours.

15. The method in accordance with claim 11 including the step of maintaining the reactive material in the range of 1 to 30 wt. %.

16. The method in accordance with claim 11 wherein said reactive material is boron oxide.

17. A method of treating sodium cyanide in spent potlining material from an electrolytic cell for producing aluminum from alumina dissolved in a sodium-containing electrolyte, wherein sodium cyanide forms in the spent potlining material, the method comprising the steps of:

(a) grinding the spent potlining material containing sodium cyanide to provide particles of spent potlining material having a particle size less than 10 mesh (U.S. Sieve Series);

(b) adding a reactive material comprised of boron oxide capable of reacting with said sodium cyanide to provide a mixture of reactive material and spent potlining material; and (c) heating said mixture to a temperature in the range of 450° to 750° C. for purposes of reacting said reactive material with said sodium cyanide to destroy said sodium cyanide.

18. The method in accordance with claim 17 including maintaining said mixture at said temperature for a period of ½ to 7 hours.

19. A method of treating sodium cyanide and fluorides in spent potlining material from an electrolytic cell for producing aluminum from alumina dissolved in a sodium- and fluorine-containing electrolyte, wherein sodium cyanide and fluorides form in the spent potlining material during operation of the cell, the method comprising the steps of:

(a) grinding the spent potlining material containing sodium cyanide and fluorides to provide particles of spent potlining material;

(b) adding a reactive material selected from the group consisting of carbide, fluoride, carbonate and oxide material capable of reacting with said sodium cyanide and adding lime to react with said fluoride to provide a mixture of reactive material, lime and spent potlining material; and (c) heating said mixture to a temperature effective in reacting said reactive material with said sodium cyanide to destroy said sodium cyanide and effective in causing said lime to react with said fluorides.

20. The method in accordance with claim 19 including heating said mixture to a temperature in the range of 450° to 750° C.

21. The method in accordance with claim 19 including grinding said spent potlining to a particle size less than 10 mesh (U.S. Sieve Series).

22. The method in accordance with claim 19 including maintaining said mixture at the temperature for a period in the range of ½ to 7 hours.

23. The method in accordance with claim 19 including the step of maintaining the reactive material in the range of 1 to 30 wt. % and said lime is in the range of 1 to 20 wt. %.

24. The method in accordance with claim 19 including the step of using fluoride reactive material selected from the group consisting of cryolite, aluminum fluoride, titanium fluoride, zirconium fluoride, calcium fluoride and magnesium fluoride.

25. The method in accordance with claim 19 including the step of using oxide reactive material selected from the group consisting of boron oxide, sodium borate, aluminum borate, sodium tetraborate, calcium borate, boric acid, calcium oxide and rare earth oxides.

* * * * *